(12) United States Patent
Simpson

(10) Patent No.: US 7,623,255 B2
(45) Date of Patent: Nov. 24, 2009

(54) PRINTING DEVICE

(75) Inventor: Shell S. Simpson, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 999 days.

(21) Appl. No.: 10/971,398

(22) Filed: Oct. 22, 2004

(65) Prior Publication Data
US 2006/0087678 A1    Apr. 27, 2006

(51) Int. Cl.
*G06K 15/02* (2006.01)
(52) U.S. Cl. ............... 358/1.15; 358/1.16; 399/12; 399/24; 399/25; 347/2; 380/51; 713/168
(58) Field of Classification Search .......... 358/1.15, 358/1.9, 1.16; 399/12, 23, 24, 25; 347/2, 347/19; 380/51, 270; 713/168, 170
See application file for complete search history.

(56) References Cited

U.S. PATENT DOCUMENTS

| | | | | |
|---|---|---|---|---|
| 4,670,857 A * | 6/1987 | Rackman | .................... | 705/51 |
| 5,365,312 A * | 11/1994 | Hillmann et al. | .................... | 399/12 |
| 6,094,721 A * | 7/2000 | Eldridge et al. | .................... | 713/168 |
| 6,233,409 B1 * | 5/2001 | Haines et al. | .................... | 399/10 |
| 6,302,527 B1 * | 10/2001 | Walker | .................... | 347/50 |
| 6,473,191 B2 * | 10/2002 | Kohno | .................... | 358/1.13 |
| 6,625,402 B2 * | 9/2003 | Takemoto | .................... | 399/12 |
| 6,629,134 B2 * | 9/2003 | Hayward et al. | .................... | 709/217 |
| 6,672,695 B1 * | 1/2004 | Naka et al. | .................... | 347/7 |
| 6,738,903 B1 * | 5/2004 | Haines | .................... | 713/168 |
| 6,863,367 B2 * | 3/2005 | Hamamoto et al. | .................... | 347/23 |
| 7,031,012 B1 * | 4/2006 | Serizawa | .................... | 358/1.16 |
| 7,044,574 B2 * | 5/2006 | Croley et al. | .................... | 347/19 |
| 7,099,028 B2 * | 8/2006 | Schneider et al. | .................... | 358/1.15 |
| 7,130,065 B2 * | 10/2006 | Kohno | .................... | 358/1.13 |
| 7,212,637 B2 * | 5/2007 | Salisbury | .................... | 380/51 |
| 7,240,995 B2 * | 7/2007 | Adkins et al. | .................... | 347/68 |
| 7,280,772 B2 * | 10/2007 | Adkins et al. | .................... | 399/12 |
| 7,324,232 B2 * | 1/2008 | Ishibashi et al. | .................... | 358/1.15 |
| 7,430,053 B2 * | 9/2008 | Wachter et al. | .................... | 358/1.14 |
| 7,460,262 B2 * | 12/2008 | Simpson | .................... | 358/1.15 |
| 2002/0003634 A1 * | 1/2002 | Kohno | .................... | 358/1.13 |
| 2002/0022990 A1 * | 2/2002 | Kurata et al. | .................... | 705/14 |
| 2002/0131784 A1 * | 9/2002 | Takemoto | .................... | 399/12 |
| 2002/0143893 A1 * | 10/2002 | Nakazono et al. | .................... | 709/217 |
| 2002/0145636 A1 * | 10/2002 | Jones et al. | .................... | 347/2 |
| 2002/0149785 A1 * | 10/2002 | Chu et al. | .................... | 358/1.9 |
| 2002/0191217 A1 * | 12/2002 | Kohno | .................... | 358/1.15 |
| 2003/0016382 A1 * | 1/2003 | Schneider et al. | .................... | 358/1.15 |
| 2003/0059050 A1 * | 3/2003 | Hohberger et al. | .................... | 380/270 |
| 2003/0122891 A1 * | 7/2003 | Hamamoto et al. | .................... | 347/23 |
| 2004/0101320 A1 * | 5/2004 | Haramoto | .................... | 399/12 |
| 2004/0125165 A1 * | 7/2004 | Croley et al. | .................... | 347/19 |

(Continued)

OTHER PUBLICATIONS

Jason Dyer, Lattice Reduction on Low-Exponent RSA, Aug. 2002, http://math.arizona.edu/~ura/022/McCallum_group/DyerFinal.pdf.*

*Primary Examiner*—Kimberly A Williams
(74) *Attorney, Agent, or Firm*—Matthew L. Wade

(57) ABSTRACT

A printing device can transmit authentication data to a client computer remotely connected to the printing device. The authentication data can be used by the client computer to authenticate itself to a server computer.

44 Claims, 14 Drawing Sheets

U.S. PATENT DOCUMENTS

2005/0172118 A1* 8/2005 Nasu .......................... 713/156
2006/0140647 A1* 6/2006 Adkins et al. ................. 399/12
2006/0279588 A1* 12/2006 Yearworth et al. ............. 347/6

* cited by examiner

Print Cartridge Memory 208

Cartridge Authentication Data 220

Secret Number 222

Cartridge Identifier 224

*FIG. 2B*

PRINTING DEVICE

BACKGROUND OF THE INVENTION

As used herein, the phrase "printing device" refers to any device that includes a printing function. Thus, for example, the phrase "printing device" may refer to an inkjet printer, a laser printer, a commercial printing press, a multifunction peripheral (MFP) that includes a printing function, etc.

Many types of printing devices are equipped with replaceable components each having a life cycle during which the replaceable component is functional. At the end of the life cycle of a replaceable component, the component is often replaced for the printing device to continue to function properly.

For example, a print cartridge is installed in many types of printing devices to provide a supply of print material (e.g., toner or ink) for the printing process. As documents are printed, the print material is gradually depleted. When the supply of print material is exhausted, or when some other part in the print cartridge wears out, the print cartridge is typically replaced. A user who wishes to obtain a replacement component, such as a print cartridge, for a printing device may purchase the component from a supplier.

New and innovative ways are needed to enable a printing device component supplier and/or a printing device manufacturer to provide valuable services and/or information to their customers.

BRIEF DESCRIPTION OF THE DRAWINGS

FIG. 2B illustrates the data that may be stored in a memory of the print cartridge;

DETAILED DESCRIPTION OF THE INVENTION

As used herein, the phrase "authentication data" refers to data that can be sent from a first computer to a second computer in order to demonstrate to the second computer that the first computer is an "authorized party". An "authorized party" refers to a computing device that has certain authority or privileges. Typically, authentication data is in accordance with a pre-determined authentication protocol.

Figure 1A:
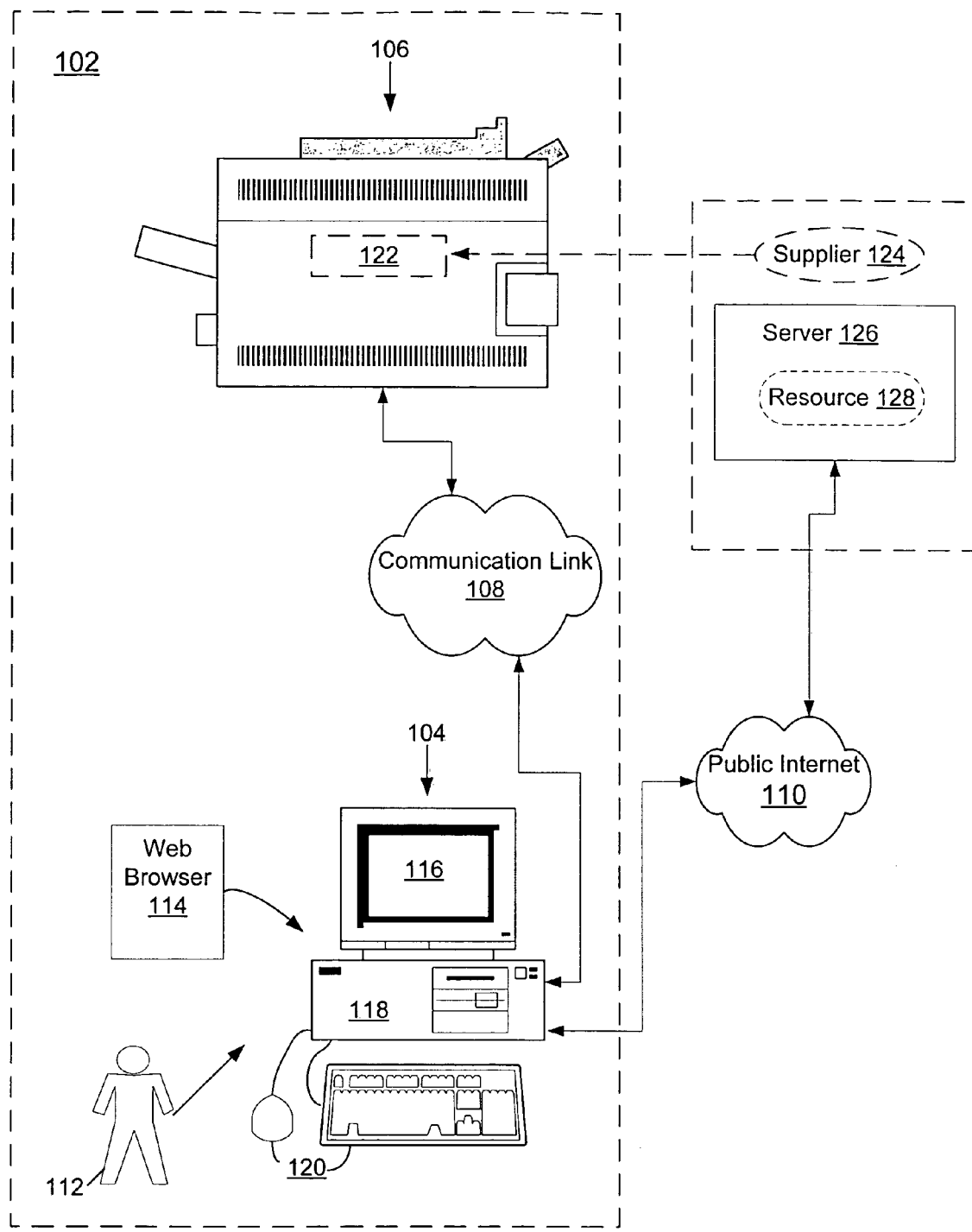
FIG. 1A is a high level block diagram of a computing system.

Shown in FIG. 1A is a computing system 102 that is in accordance with an example embodiment of the invention. The computing system 102 includes a client computer 104 and a printing device 106. The client computer 104 is capable of communicating with the printing device 106 over a local communication link 108. The local communication link 108 may represent a communication cable, a wireless communication path, a network, etc.

The client computer 104 is also capable of communicating over the Public Internet 110. In some implementations, for example, the client computer 104 connects to the Public Internet 110 via a firewall.

The client computer 104 may be any type of computing device that allows a user 112 to interactively browse Web pages. In the present embodiment, the client computer 104 runs a Web Browser application 114 and includes a display 116, a central processing unit (CPU) 118, and various user input devices 120. The user input devices 120 may include a keyboard and/or a computer mouse. In specific implementations, the client computer 104 may represent a desk-top computer, a workstation, a lap-top computer, a personal digital assistant (PDA), a cell phone that permits Web Browsing, etc.

The printing device 106 may be any type of printing device that uses a replaceable component. In the present embodiment, for example, the printing device 106 is a laser printing device. Installed in the printing device 106 is a replaceable print cartridge 122 that provides a supply of toner for the printing process.

We will assume in the following discussion that the user 112 has purchased (or otherwise acquired) the print cartridge 122 from a particular component supplier 124. Thus, the user 112 is a customer of the component supplier 124.

As indicated in FIG. 1A, the component supplier 124 maintains a server computer 126 on the Public Internet 110 in order to provide a resource 128 for the benefit of its customers. In the present embodiment, the resource 128 can be requested using a version of the Hypertext transfer protocol (HTTP) and is assigned a unique Uniform Resource Locator (URL) address.

It is noted that the resource 128 may represent a routine (or routines) that the server computer 126 can perform in response to a client request and/or a file (or files) that the server computer 126 can deliver to a client in response to a client request. In some implementations, for example, the resource 128 provides a client with content that a customer of the supplier 124 might consider of value. Such content may be in the form of text, digital images, artwork, animation, streaming multimedia video and/or streaming audio, for example.

In this respect and in specific implementations, the resource 128 may represent a Web page, or some other type of file, that includes content a customer of the supplier 124 may value. In other specific implementations, the resource 128 may represent a multi-media video that includes content a customer may value.

Of course the possibilities of what type of content could be delivered by the server computer 126 in response to a client request for the resource 128 are nearly endless. Therefore, the actual content that is delivered in various embodiments of the invention can vary quite significantly. By way of example, according to one implementation the content is an educational online course that may be of interest to a customer and that can be delivered by the server computer 126 to a client computer via streaming multimedia video. According to another implementation, the content is a library of images (e.g., unique clip art) that may be of interest to a customer.

General Overview of Authentication Scheme

Figure 1B:
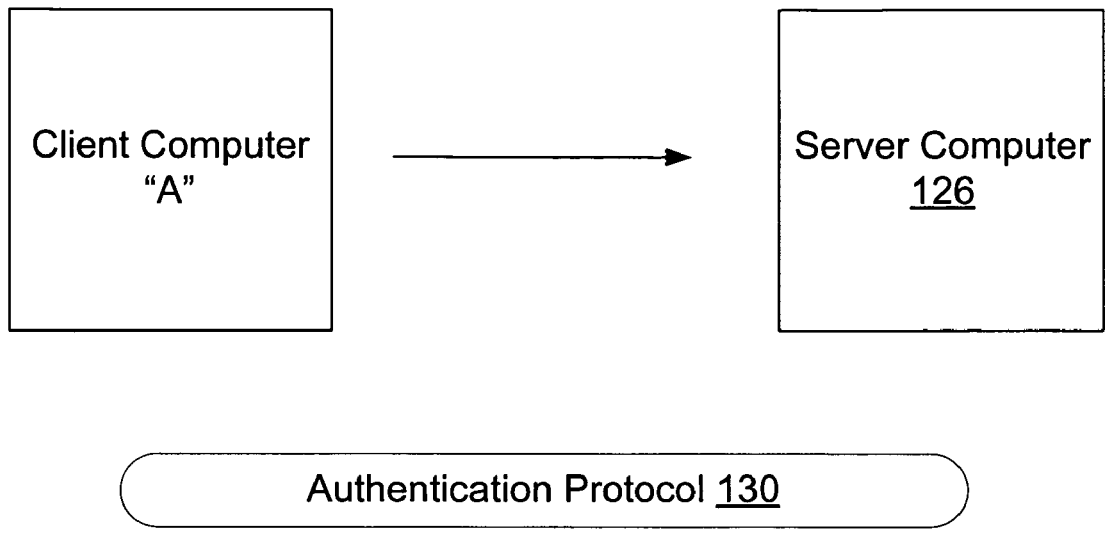
FIG. 1B illustrates an authentication protocol followed by a server.

As indicated in FIG. 1B, the server computer 126 implements an authentication protocol 130 in order to control access to the resource 128. In accordance with this protocol, a client computer (e.g., client computer "A") transmits authentication data to the server computer 126 in order to demonstrate authority to access the resource 128. In this embodiment, the authentication data is specified by parameters that are included in a request for the resource 128.

Figure 1C:
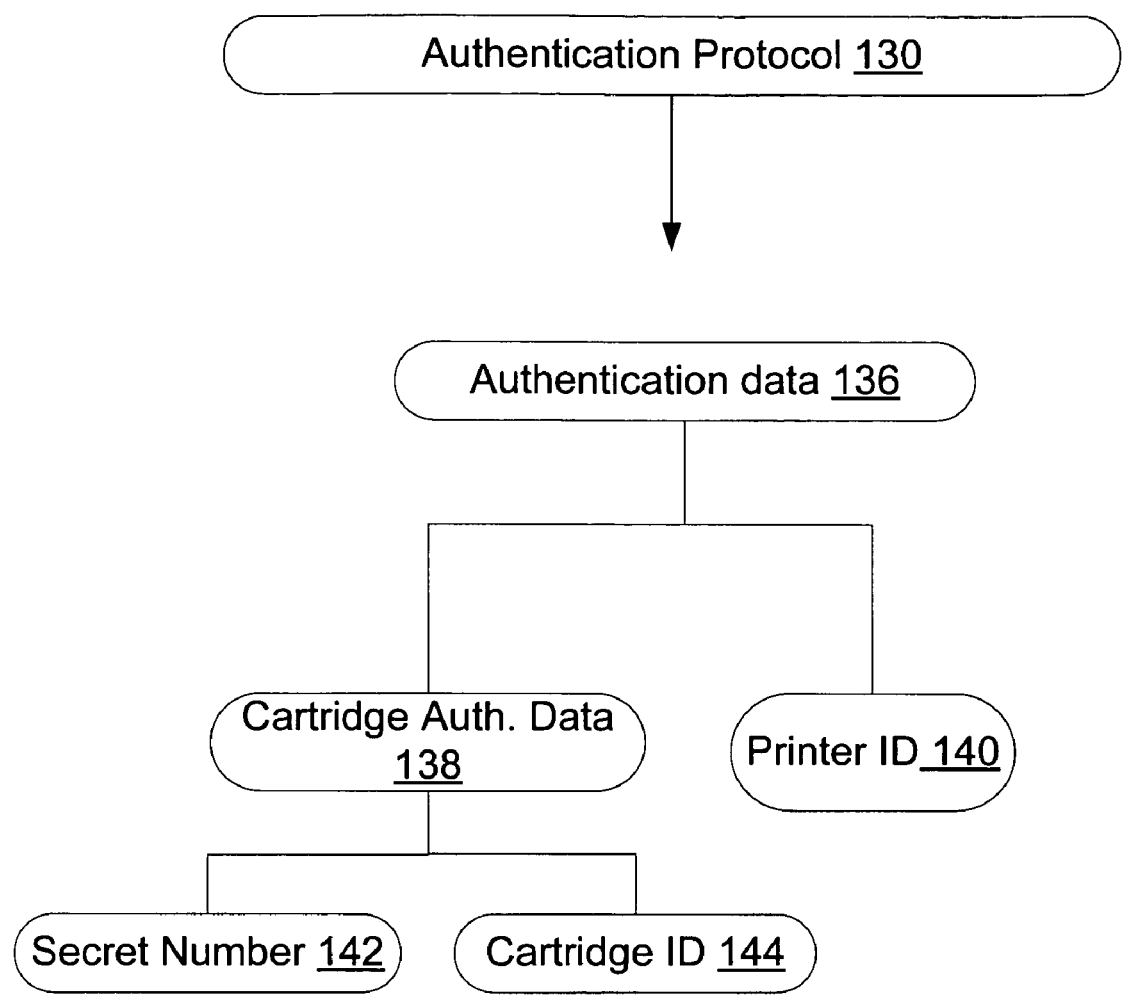
FIG. 1C illustrates authentication data that is in accordance with the authentication protocol.

As shown in FIG. 1C, authentication data (e.g., authentication data 136) that is in accordance with the authentication protocol 130 can be logically divided into a first and a second set of data. The first set of data is obtained from a memory of a print cartridge that is provided by the component supplier 124. For ease of discussion, we may refer to this first set of data as "cartridge authentication data". The cartridge authentication data, in the present embodiment, describes a secret number and a unique identifier (cartridge identifier) that can identify the print cartridge. The second set of data is a unique identifier (printer identifier) that identifies the printing device presently using the print cartridge.

Thus, for example, the authentication data 136 shown in FIG. 1C includes cartridge authentication data 138 and a printer identifier 140. The cartridge authentication data 136 describes a secret number 142 and a cartridge identifier 144. The cartridge identifier 144 identifies the particular cartridge that presently stores the cartridge authentication data 138. The printer identifier 142 identifies the particular printing device that is presently using the print cartridge.

Figure 1D:
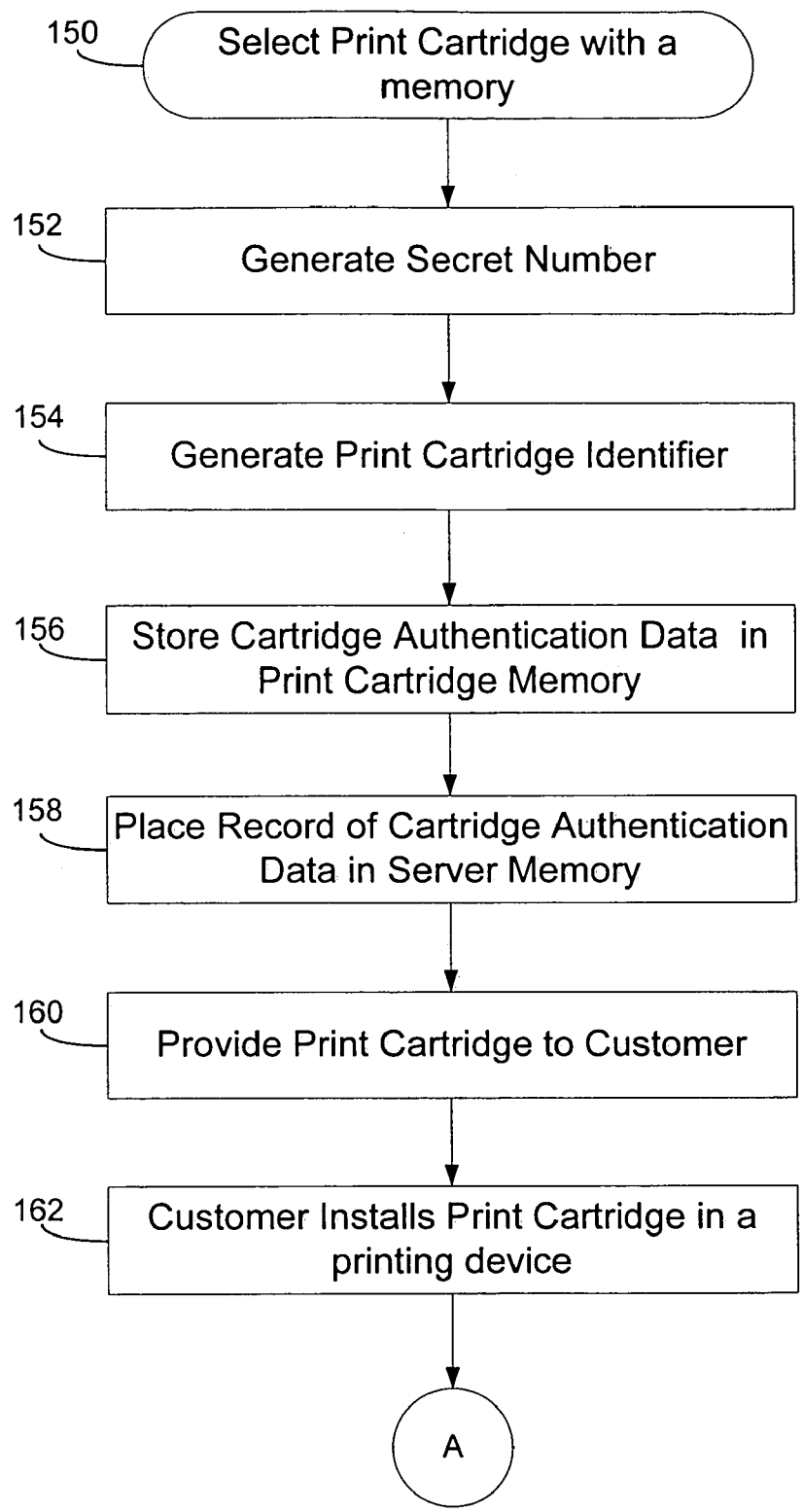
FIG. 1D-1E show a flow diagram illustrating how a supplier may configure a print cartridge with authentication data.
Figure 1E:
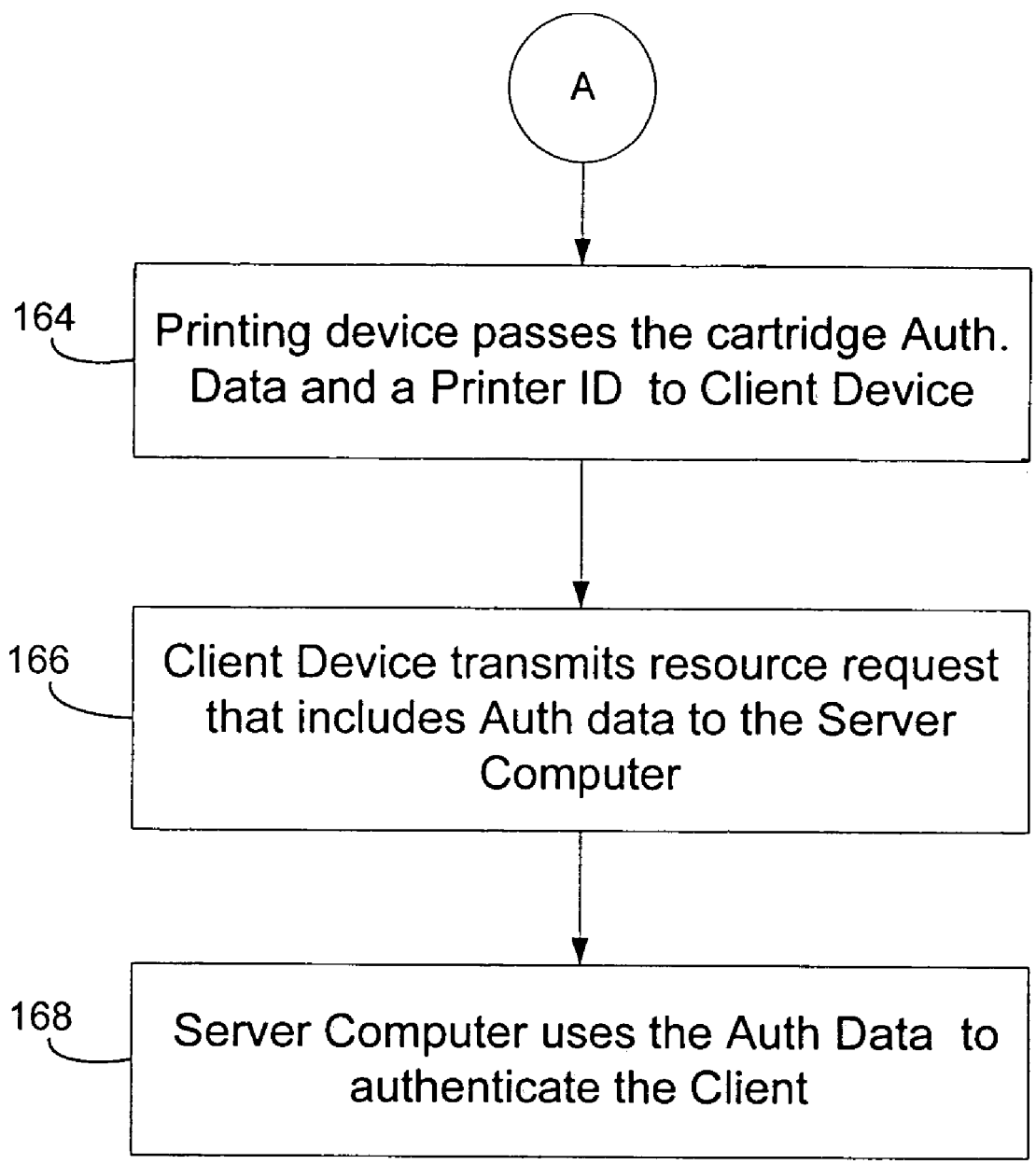

Shown in FIGS. 1D and 1E is a flow diagram illustrating generally how the component supplier 124 provides its customers with the ability to access the resource 128.

At step 150, a print cartridge that includes a memory is selected by the component supplier 124. At step 152, a secret number is generated. In the present embodiment, this step is performed at the direction of the component supplier 124 or by a third party that the component supplier 124 trusts. In specific implementations, for example, the secret number may be a randomly generated number and/or a large number (e.g., a number greater than 2000 bits) that would be hard for an un-trusted third party to guess.

At step 154, a unique identifier is generated that can identify the selected print cartridge.

At step 156, the secret number and the print cartridge identifier is stored in the memory of the selected print cartridge.

At step 158, a record of the cartridge authentication data (i.e., the secret number and the print cartridge identifier) is stored in an internal memory of the server computer 126.

At step 160, the print cartridge (now configured with cartridge authentication data) is provided to a customer of the component supplier 124.

At step 162, the customer installs the print cartridge in his/her printing device.

At step 164, the printing device passes authentication data to a client computer. The authentication data is in accordance with the authentication protocol 130 and includes the cartridge authentication data and a printer identifier that identifies the printing device. In this example embodiment and as discussed further below, the printing device performs this step by providing the client with a web page that includes a hyperlink to the resource 128. The authentication data is included in the hyperlink.

At step 166, the client computer receives the authentication data from the printing device and then transmits a request for the resource 128 to the server computer 126. The request includes the authentication data received from the printing device.

At step 168, the server computer 126 receives the authentication data and uses this data to determine if the client computer has the authority to access the resource 128. In part, this step is accomplished by verifying that the server computer 126 has a record of the cartridge authentication data that is included with the authentication data.

Print Cartridge Construction

Figure 2A:
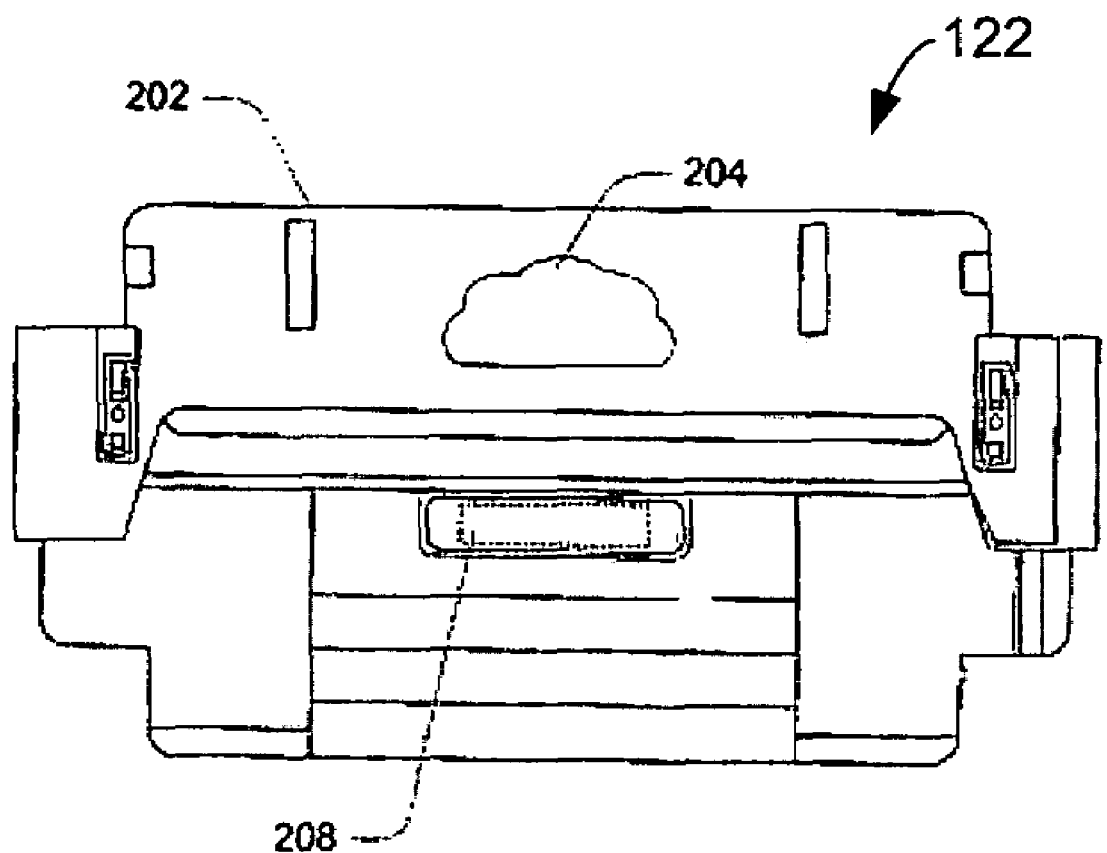
FIG. 2A illustrates a print cartridge that is installed in the printing device.

FIG. 2A illustrates the print cartridge 122 that is installed in the printing device 106. As shown, the print cartridge 122 includes a housing 202 that contains a supply of toner material 204. The print cartridge 122 further includes a non-volatile memory 208 that is in an integrated part of the print cartridge 122. In this example, the print cartridge memory 208 is permanently attached to an outer surface of the print cartridge housing 202 as shown.

It is noted that in some specific implementations, for example, the print cartridge memory 208 is of a type that can be accessed over a wireless communication link. In these implementations the print cartridge memory 208 may represent a radio frequency identification (RFID) tag, for example. In other implementations, the memory 208 may be of a type that can be accessed via a hard-wired connection.

As shown in FIG. 2B, the print cartridge memory 208 stores cartridge authentication data 220 that is in accordance with the authentication protocol 130. The cartridge authentication data 220 includes a secret number 222 and a cartridge identifier 224 (e.g., a serial number) that identifies the print cartridge 122. As discussed further below, the server computer 126 maintains a record of the cartridge authentication data 220.

Printing Device Construction

Figure 3:
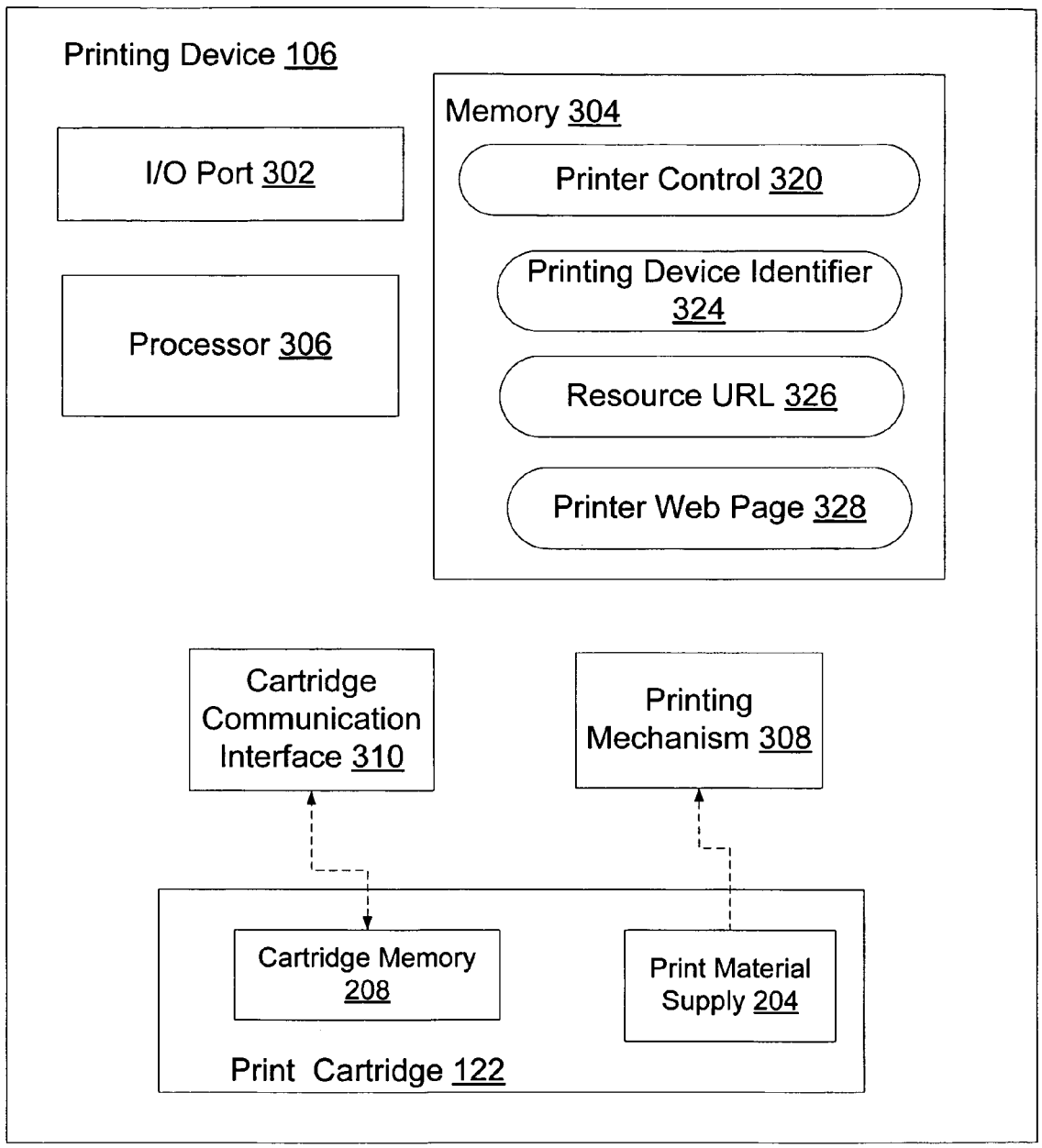
FIG. 3 is a high level block diagram a printing device.

FIG. 3 is a high level block diagram illustrating one example of how the printing device 106 may be constructed in accordance with an embodiment of the invention. FIG. 3 shows the printing device 106 with the print cartridge 122 installed.

As shown in FIG. 3, the printing device 106 may include an Input-output (I/O) port 302, a memory 304 and a processor 306. The printing device 106 may further include a printing mechanism 308 and a cartridge memory communication interface 310.

The I/O port 302 is generally any hardware, firmware, or gate level logic enabling the printing device 106 to communicate with the client computer 104 over the communication link 108.

The memory 304 is generally any memory device or set of memory devices enabling the printing device 106 to store certain information. In this embodiment, for example, the memory 304 stores printer control firmware 320 that the processor 306 can execute. The memory 304 also stores a printer identifier 324, the URL address 326 that is assigned to the resource 128 and a printer Web Page 328. The printer identifier 324 may represent a unique serial number assigned to the printing device 106.

The printing mechanism 308 enables the printing device 106 to controllably place marks on a print media. As previously noted, in this embodiment, the printing device is a laser printer. The printing mechanism 308 may therefore include a photoconductor and an exposure system for controllably exposing the photoconductor so as to create a latent image. During printing, the printing mechanism 308 uses toner (that can be obtained from the installed print cartridge 122) to develop the latent image. The developed latent image may then be transferred (directly or indirectly) to a print media so as to generate printed output.

The cartridge memory communication interface 310 enables the printing device 106 to read the cartridge authentication data 220 from the print cartridge memory 208 when the print cartridge 122 is installed. In implementations wherein the cartridge memory 208 can be accessed wirelessly, the cartridge communication interface 310 may include circuitry that enables the printing device to access the print cartridge memory 208 over a wireless communication link. If, however, the cartridge memory 208 is accessible via a hard-wired connection the cartridge communication interface 310 may include circuitry that temporarily establishes a hard-wired connection with the print cartridge memory 208 while the print cartridge 122 is installed in the printing device 106.

Server Computer Construction

Figure 4:
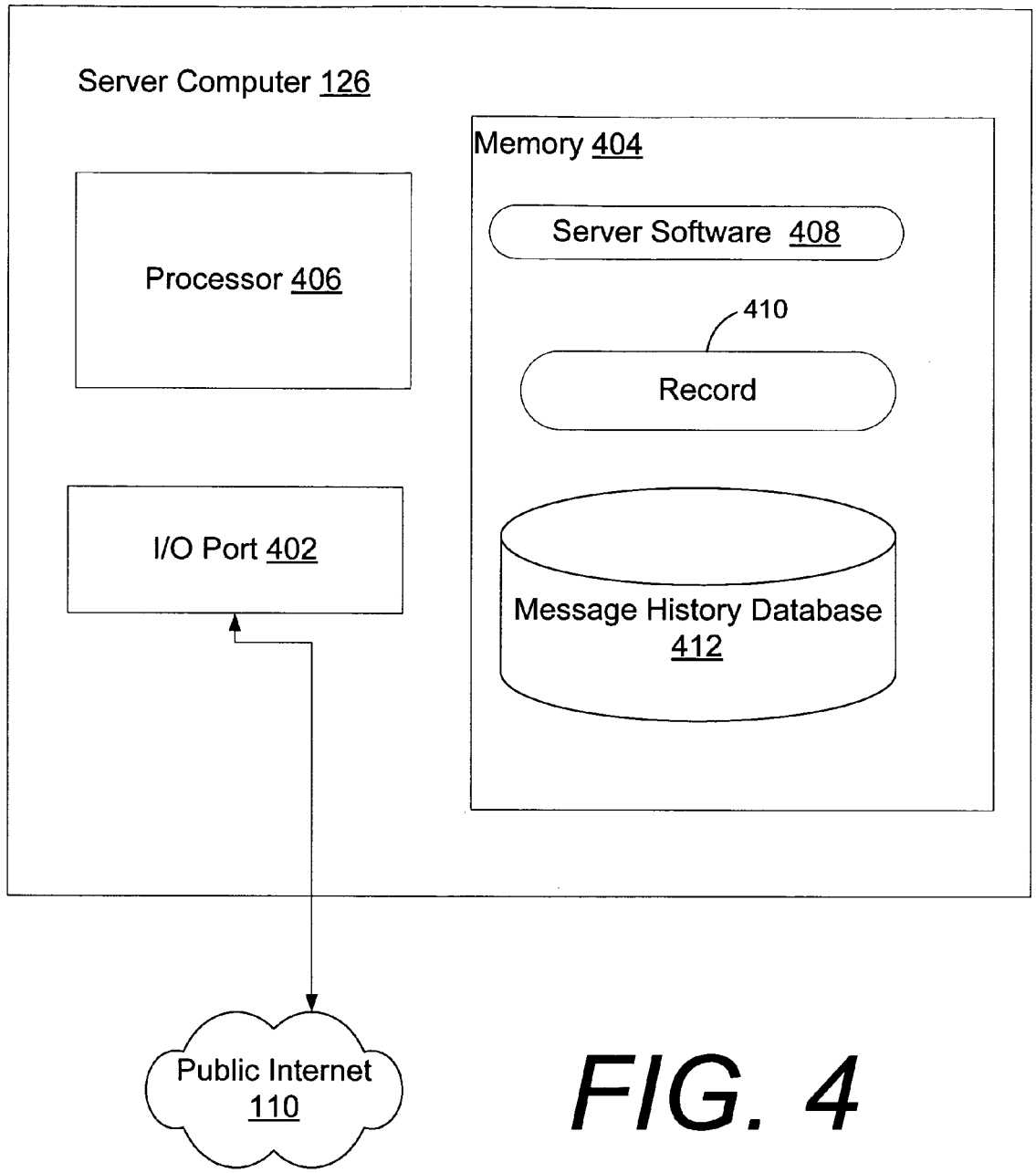
FIG. 4 is a high-level block diagram of a server computer.

FIG. 4 is a high-level block diagram illustrating one example of how the server computer 126 may be constructed in accordance with an embodiment of the invention. As shown in FIG. 4, the server computer 126 may include an input-output (I/O) port 402, a memory 404 and a processor 406.

The I/O port 402 is generally any hardware, firmware, or gate level logic enabling the server computer 126 to communicate over the Public Internet 110. In some implementations, the I/O port 402 enables the server computer 126 to be connected to a local intranet system that is interconnected to the Public Internet 110 via a firewall.

The memory 404 is generally any memory device or set of memory devices enabling the server computer 126 to store a server software module 408, a record 410 and a ☐message history☐database 412. The record 410 specifies the cartridge authentication data 220 that is stored the print cartridge memory 208.

The message history database 412 maintains a record of certain information that was included in previously received requests for the resource 128. As noted above, authentication data that is accordance with the authentication protocol 130 includes a secret number, a cartridge identifier, and a printer identifier. When a request (for the resource 128) that includes this information is received, the server computer 126 may place a record in the message history database 412. The record specifies the cartridge identifier as well as the printer identifier that is included with the request. As will be discussed further below, this information may subsequently be used to detect the scenario wherein the cartridge authentication data is being distributed in an unauthorized way.

The processor 406 is generally any processor device or set of processor devices that can execute the software module 408. The software module 408 enables the server computer 126 to provide the resource 128 as well as to maintain the message history database 412.

Operation of Printing Device and Client Computer

Figure 5A:
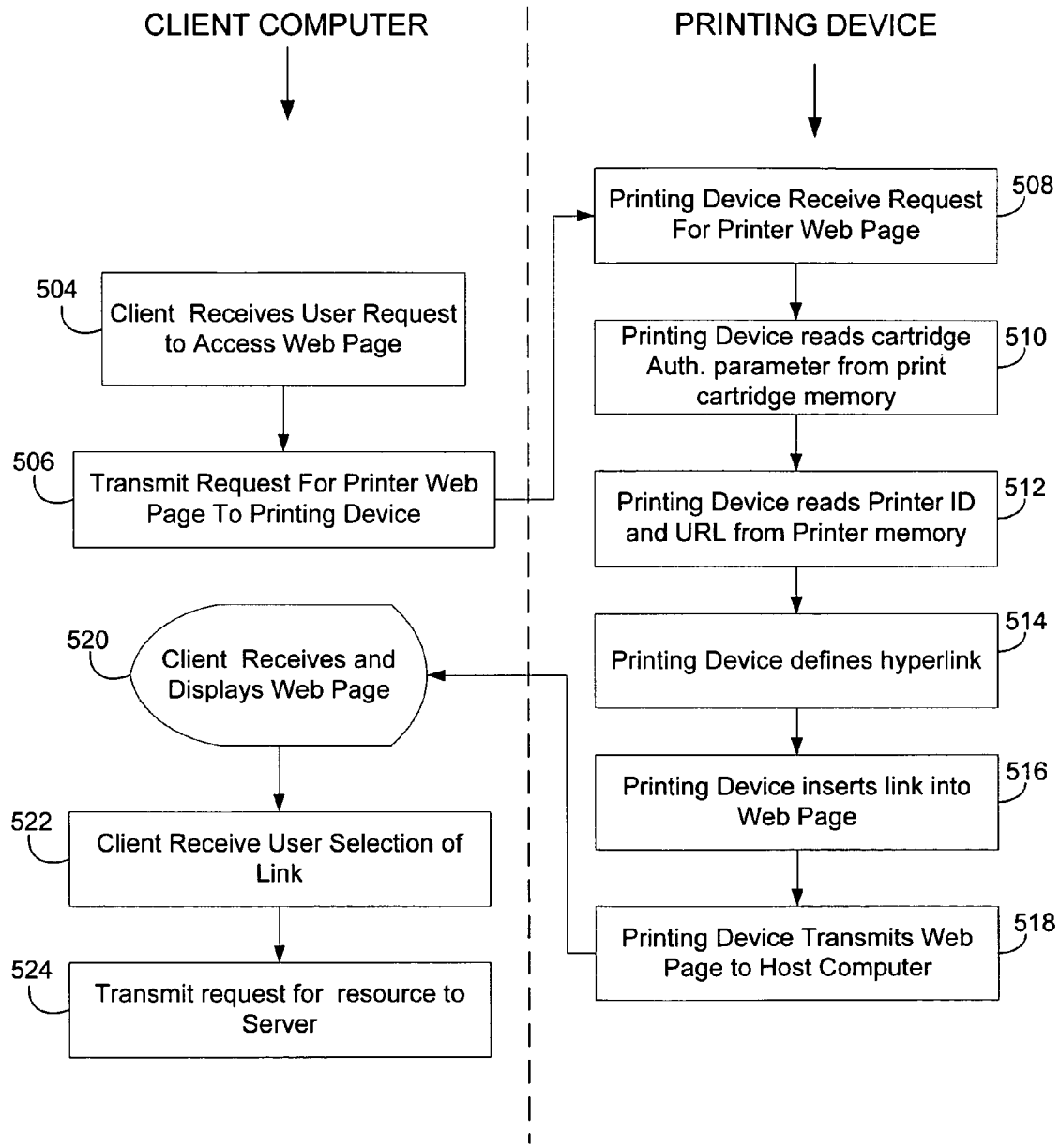
FIG. 5A is a flow diagram illustrating how a client computer may interact with a printing device.

FIG. 5A is a flow diagram illustrating generally how the client computer 104, while executing the Web Browser 114, may interact with the printing device 106 to obtain authentication data for transmission to the server computer 126. FIG. 5A further shows how the client computer 104 can then use this information to authenticate itself to the server computer 126 in accordance with the authentication protocol 130.

Beginning at step 504, we assume the user 112 interacts with the client computer 104 to input a user request to retrieve the printer Web Page 328. This step may involve the user 112 inputting a URL address assigned to the printer Web page 328.

At step 506, the client computer 104 responds to the user request by transmitting an electronic request for the printer Web Page 328 over the communication link 108.

At step 508, the printing device 106 receives the request and in response thereto performs steps 510-518. The printing device 106 may automatically perform these steps at the direction of the printer control firmware 320.

At step 510, the printing device 106 reads the cartridge authentication data 220 from the print cartridge memory 208. At step 512, the printing device 106 reads the printer identifier 324 and the URL address 326 (of the resource 128) from the printer memory 304.

At step 514, the printing device 106 uses the information obtained at step 510-512 to define a hyperlink. The hyperlink is formatted so that, when selected, a request for the resource 128 is transmitted to the server computer 126. The request includes authentication data that is in accordance with the authentication protocol 130. The authentication data may, for example, be in the form of parameters that specify the cartridge authentication data 220 and the printer identifier 324. The authentication data may alternatively be passed to the server as hidden fields in a form.

At step 516, the printing device 106 inserts the hyperlink into the Web page 328. At step 518, the printing device 106 transmits the Web page 328 (now modified to include the hyperlink) to the client computer 104. At step 520, the client computer 104 receives the modified Web Page 328 and displays it to the user 112.

At step 522, the user 112 further interacts with the client computer 104 to select the hyperlink included with the Web page 328. In response to the hyperlink being selected, the client computer 104 operates to transmit a request for the resource 128 to the Server computer 126 (step 524). The request includes parameters that specify the cartridge authentication data 220 and the printer identifier 324.

Operation of Server System

Figure 5B:
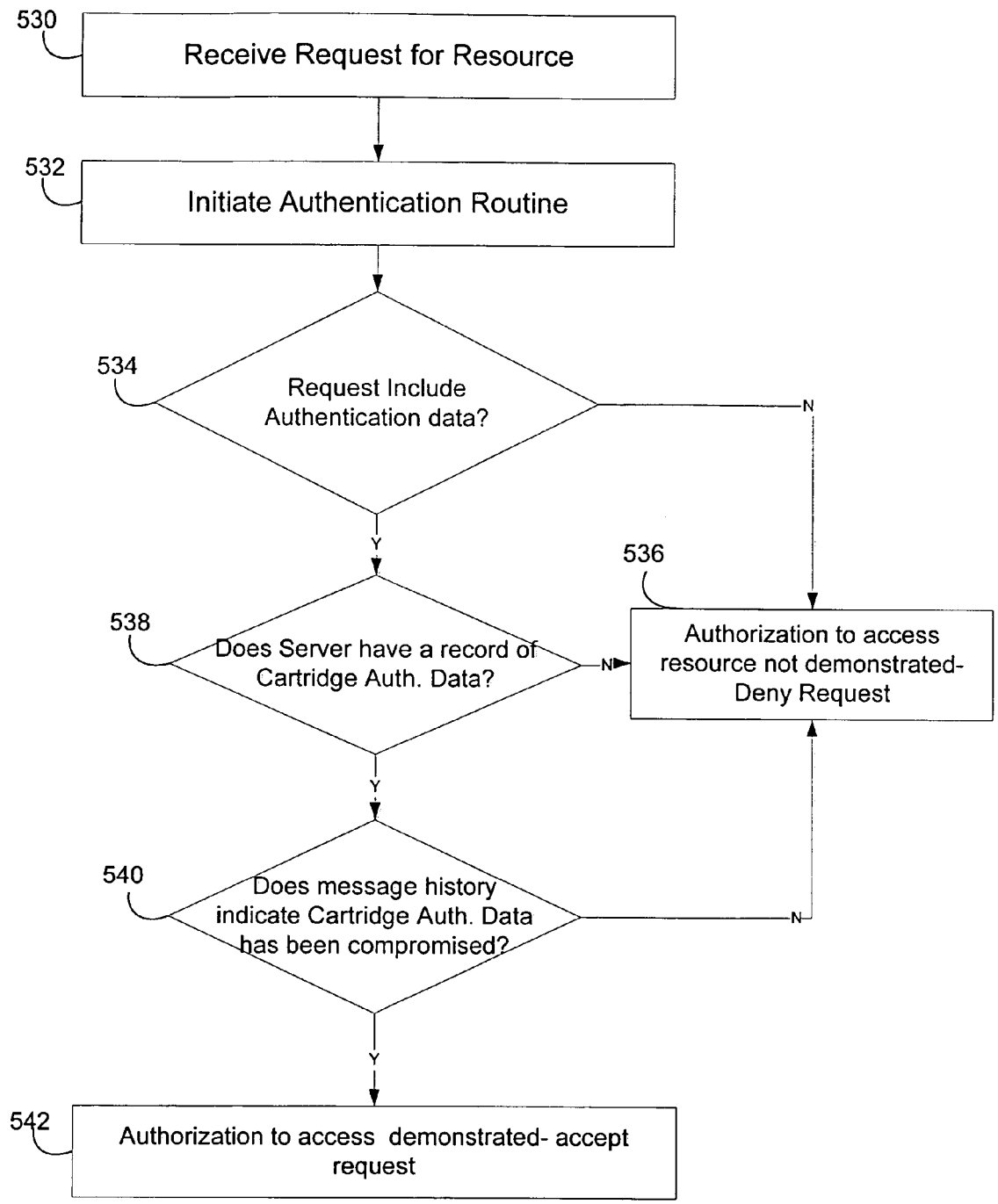
FIG. 5B is a flow diagram illustrating how a server computer may respond to a request for a resource.

FIG. 5B shows a flow diagram illustrating one way the server computer 126 may operate upon receiving the current request (i.e., the request transmitted at step 524) for the resource 128. The server computer 126 may automatically perform these steps at the direction of the server software 408.

At step 530, the server computer 126 receives the request for the resource 128. In response to the request, the server computer 126 initiates an authentication routine to determine if the originator of the request (i.e., the client computer 104) is an authorized party and is therefore entitled to access the resource 128 (step 532). One embodiment of the authentication routine is illustrated by steps 534-540.

At step 534, the server computer 126 determines if the current request for the resource 128 include parameters that specify cartridge authentication data and a printer identifier in accordance with the authentication protocol 130. If these parameters are not included in the request, the server computer 126 determines that the party that transmitted the request is not an authorized party and the request for the resource 128 is denied (step 536). If, however, the request does include these parameters the server computer 126 proceeds to step 538.

In this example, the current request includes parameters that specify the cartridge authentication data 220 and the printer identifier 324. This is in accordance with the authentication protocol 130. Therefore, the server computer 126 proceeds to step 538.

At step 538, the server computer 126 determines if it has a record of the cartridge authentication data that is included in the request. If no such record exists, then the request for the resource 128 is denied (step 536). If, however, such a record does exist, the server computer 126 proceeds to step 540.

In this example, the current request includes the cartridge authentication data 220. Furthermore, the server computer 126 includes a record (i.e., the record 410) of this data. Thus, the server computer 126 proceeds to step 540.

At step 540, the server computer 126 uses the information included in the message history database 412 to determine if the cartridge authentication data included in the current request has been compromised.

If such a condition is detected, then the request for the resource 128 is denied (step 536). If, however, such a condition is not detected then the originator of the request is determined to be an authorized party and access to the resource 128 permitted (step 542). Thus if the resource 128 is a Web page, for example, the server computer 126 would transmit the Web page to the client computer 104 if the client computer 104 is determined to be an authorized party.

Before we discuss one specific way the server computer 126 could perform step 540, it is instructive to first consider the following scenario. Suppose a third party has obtained, in an unauthorized way, a copy of the cartridge authentication data 220. Suppose further this third party is widely distributing print cartridges that include a copy of the cartridge authentication data 220 and that each of these cartridges is installed in a different printing device that operate in a similar manner as the printing device 106.

It can be seen that in the scenario just described, the server computer 126 may receive a number of requests for the resource 128 that specify a copy of the cartridge authentication data 220 but a different printer identifier.

Step 540 may be performed to detect this scenario and may be based upon an assumption that it would be unlikely a print cartridge (e.g., the print cartridge 122) would be installed, over its lifetime, in more than "N_thresh" different printing devices. Thus, if the message history database 412 indicates that more than "N_thresh" different requests for the resource 128 have included the cartridge authentication data 220 but a uniquely different printer identifier, this would be an indication that the cartridge authentication data 220 has been copied and is being distributed in an unauthorized way. Put another way, this condition is an indication that the secret number 222 is no longer a secret.

Thus, for example, suppose five requests for the resource 128 had been previously received that included the cartridge authentication data 220. The printer identifier specified by each of these requests is as follows:

Previous Request #1 specified a printer identifier of "983543";
Previous Request #2 specified a printer identifier of "983543";
Previous Request #3 specified a printer identifier of "8452435";
Previous Request #4 specified a printer identifier of "432345";
Previous Request #5 specified a printer identifier of "983543".

In this example, N_unique=3 as there are three unique printer identifiers specified by the five previous requests. If N_thresh is set to 4, therefore, the current request for the resource 128 would be accepted as the value of "N_thresh" is greater than "N_unique".

OTHER EXAMPLE EMBODIMENTS

Figure 6:
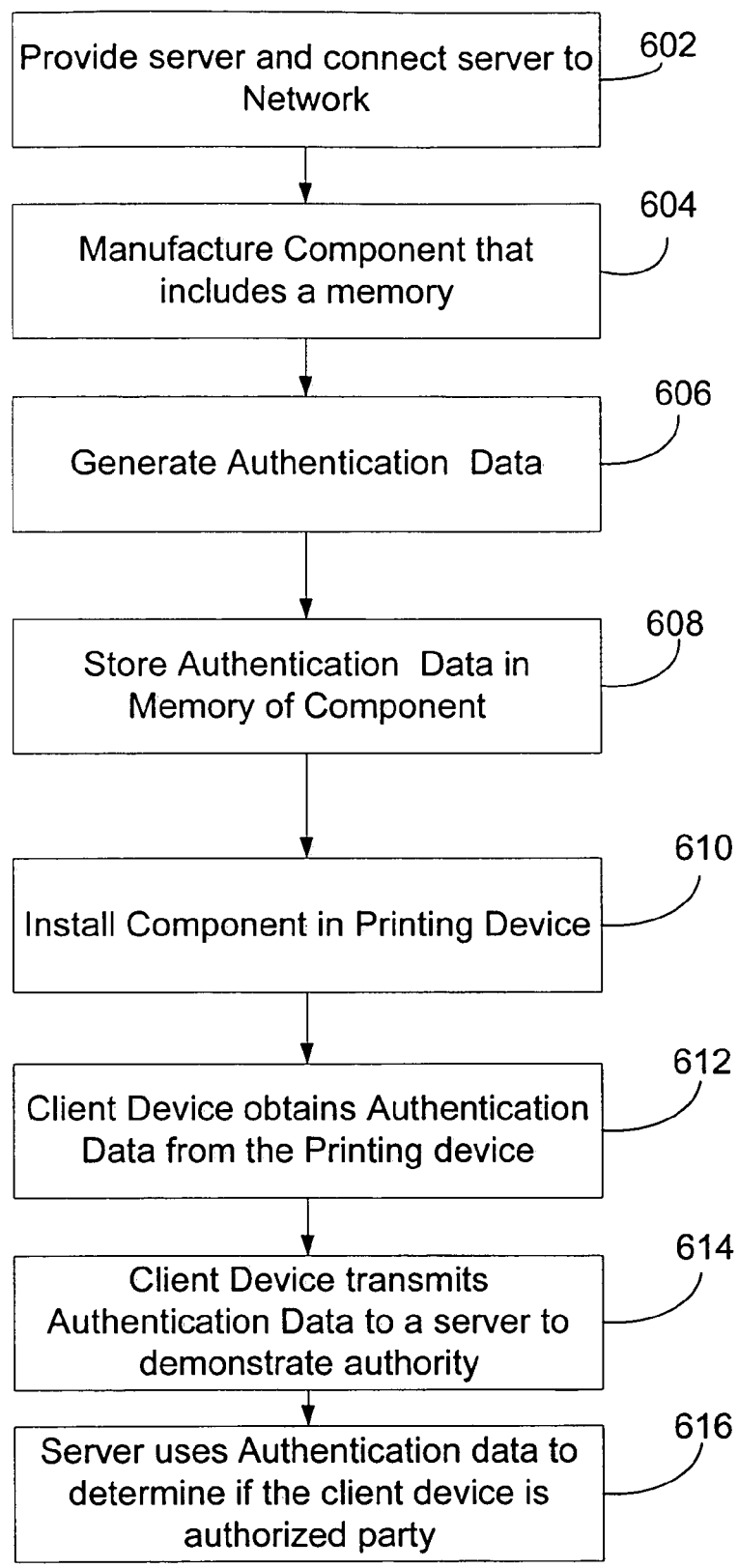
FIG. 6 is a flow diagram illustrating how a client device may obtain authentication data from a printing device.

FIG. 6 is a flow diagram illustrating another embodiment of the invention. Referring now to FIG. 6, at step 602 a server computer is provided and connected to a network, such as the Public Internet. The server computer can provide a resource to authorized client devices.

At step 604, a manufacturer manufactures a printing device component that includes a memory. The component may be any type of component that can be used in a printing device. In some specific implementations, the component may represent a replaceable component such as a replaceable print cartridge that contains toner or ink.

At step 606, authentication data is generated that is in accordance with some pre-determined authentication protocol. At step 608, the authentication data is stored in the memory of the printing device component.

At step 610, the component is installed in a printing device. The printing device may be any type of printing device, such as an inkjet printing device or a laser printing device, for example. The printing device may even represent a commercial printer that uses liquid toner or liquid ink to print documents.

At step 612, a client computer obtains the authentication data from the printing device. The client computer may obtain the authentication data from the printing device in any manner.

At step 614, the client computer transmits the authentication data to the server computer in order to demonstrate it (i.e., the client computer) is an authorized party.

At step 616, the server computer uses the authentication data to determine if the client computer is an authorized party.

Figure 7:
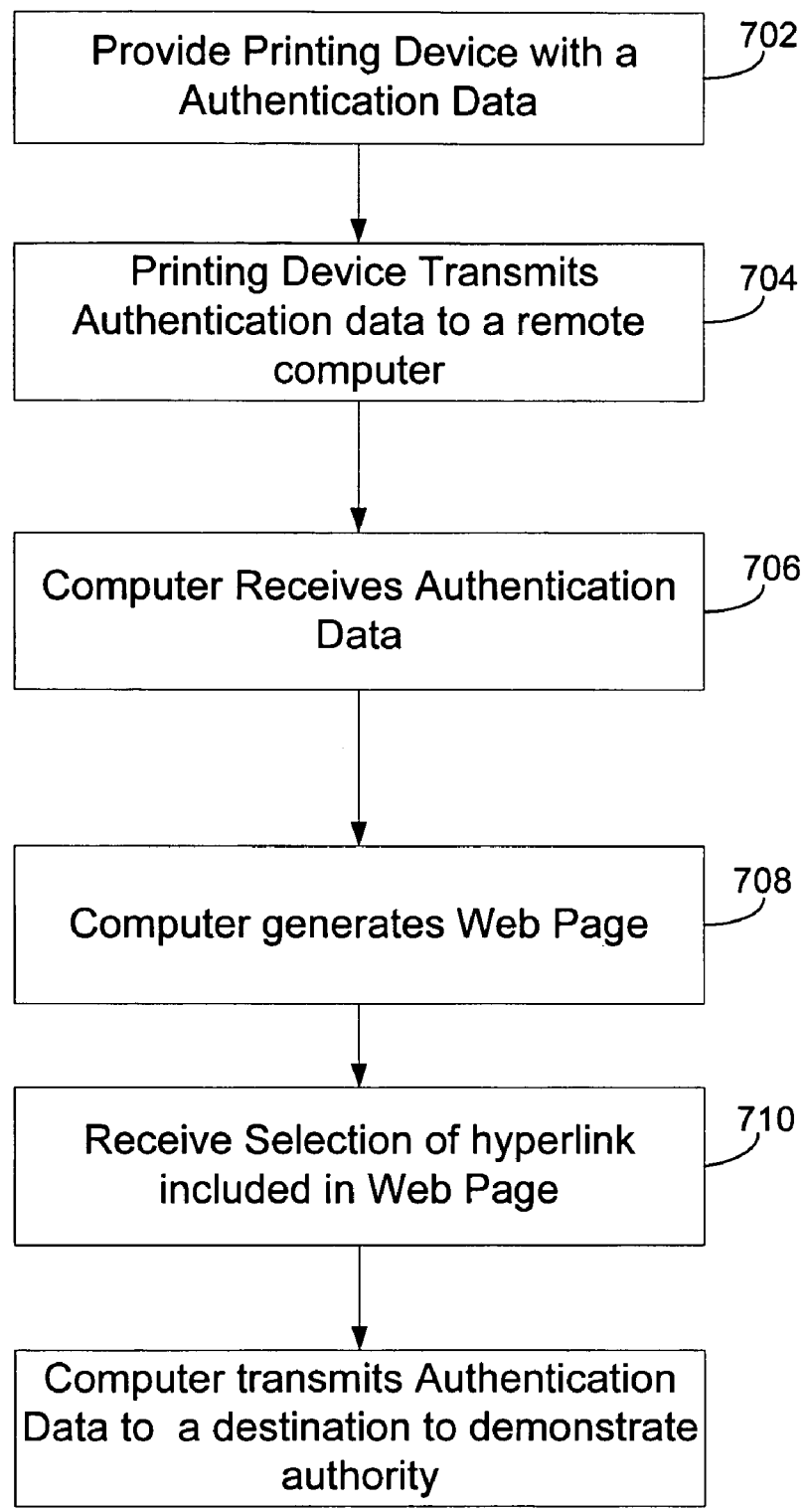
FIG. 7 is a flow diagram illustrating how a printing device may provide authentication data to a client device.

FIG. 7 is a flow diagram illustrating another embodiment of the invention. At step 702, a printing device is provided authentication data (step 702) that is in accordance with a pre-determined authentication protocol. The authentication data may be used by a client device to authenticate itself to a pre-identified server computer.

It is noted that step 702 may be performed by the manufacturer of the printing device. For example, the authentication data may be stored in a memory internal to the printing device prior to the printing device being provided to a customer.

At step 704, the printing device transmits the authentication data to a client computer that is remotely attached to the printing device. The authentication data may be transmitted, for example, using a printer management language (e.g., PML, SNMP, various proprietary protocols, etc).

At step 706, the client computer receives the authentication data. At step 708, the client computer generates a graphical user interface (e.g., a Web page) that includes a hyperlink. This step may be performed at the direction of one or more software modules running on the client computer.

At step 710, the client compute receives a selection of the hyperlink. The hyperlink is configured so that the selection at step 710 causes the client computer to transmit the authentication data to the pre-identified server computer.

At step 712, the server computer receives the authentication data and uses this data to determine that the client computer is an authorized party.

In yet another embodiment, a challenge/response block authentication scheme is used. According to one implementation a client transmits a request to the server. In response to the request, the server generates a challenge block and transmits the challenge block back to the client. The client then passes the challenge block to the printing device.

When the printing device receives the challenge block from the client, it generates a response block using a private cryptographic key. The key may have been obtained by the printing device from a memory of print cartridge or some other component installed in the printing device.

After the response block is generated, the printing device passes the response block back the to the client device. The client device then forwards the response block on to the server in order to authenticate itself to the server.

The server receives the response block from the client and then processes the response block in order to verify the client is an authorized party.

Thus, in the example embodiment just described, the authentication data passed from the printing device to the client device and then to the server is a response block that is generated using a private key that the printing device possesses.

Figure 8:
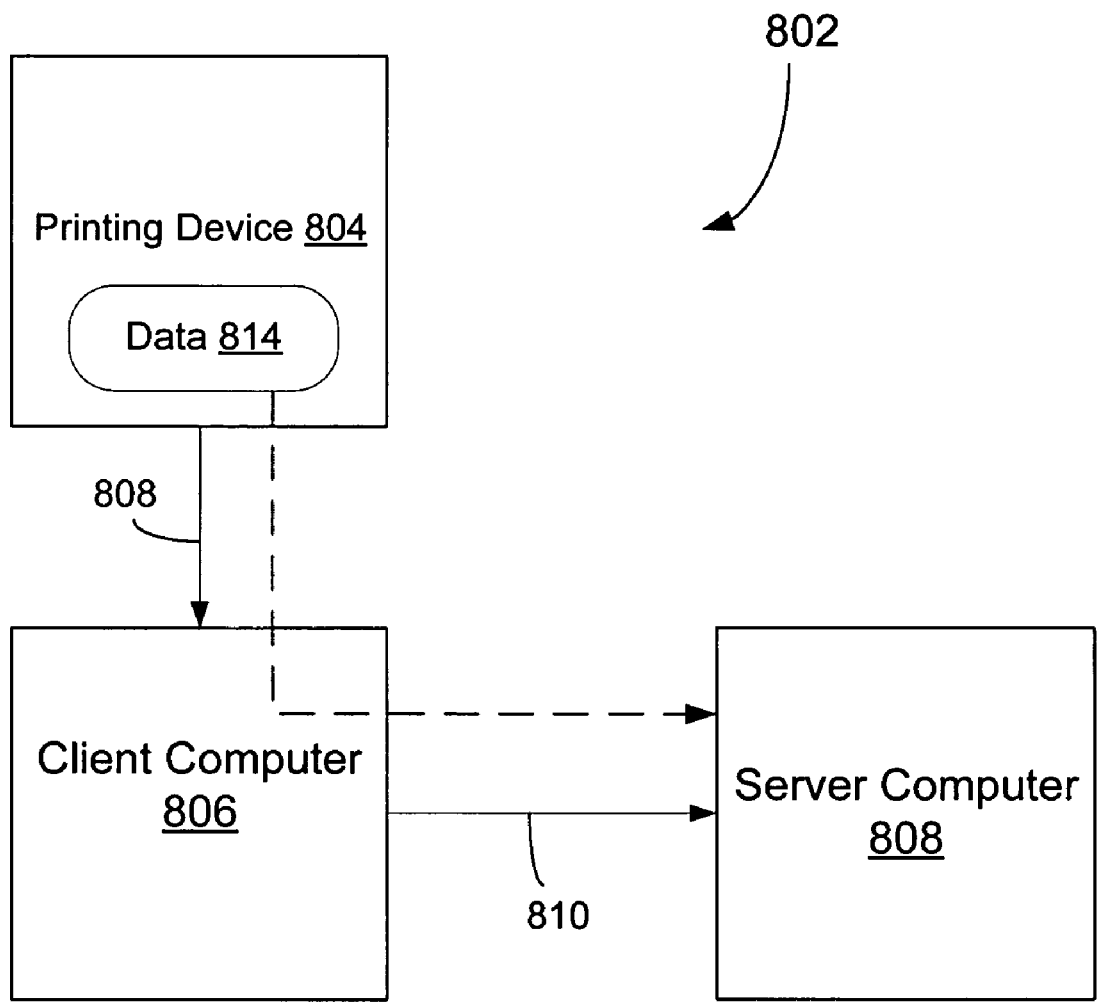
FIG. 8 is a high-level block diagram of a computing system.

FIG. 8 shows a computing system 802 that is in accordance with another example embodiment of the invention. The computing system 802 includes a printing device 804, a client computer 806 and a server computer 808.

The printing device 804 and the client computer 806 are connected via a first communication link 808. The client computer 806 and the server computer 808 are connected via a second communication link 810. The client computer 806 and the server computer 808 adhere to a pre-determined protocol 812 that defines how the client computer 806 can authenticate itself to the server computer 808.

In accordance with the protocol 812, the client computer 806 can pass data 814 to the server computer 808 in order to authenticate itself to the server computer 808. As indicated in FIG. 8, the data 814 is obtained by the client computer 806 from the printing device 804.

According to various implementations, the data 814 may be (or include) a unique identifier of a component that is presently installed in the printing device 804. The data 814 may also be in an encrypted form.

In various implementations, for example, the data 814 may represent one or more encrypted numbers. For example, the data 814 may describe a first and a second number. The first number is an encrypted version of the second number. Upon receiving the data 814, the server computer 808 may decrypt the first number and compare it to the second number. If the decrypted version of the first number matches the second number, the server computer 808 determines that the client computer 806 is an authorized party.

It is further noted that the present invention may be embodied in the form of a "computer-readable medium". As used herein, the phrase "computer readable medium" can refer to any medium that can contain or store computer executable instructions. Thus, in this document, the phrase "computer-readable medium" may refer to a medium such as an optical storage device (e.g., a CD ROM) or a magnetic storage device (e.g., a magnetic tape).

Thus, a memory component (e.g., the server memory 404 or the printing device memory 304) that stores computer executable instructions (e.g., the server software module 408 or the firmware module 324) may represent an embodiment of the invention.

Although several embodiments of the invention have been described and illustrated, the invention is not to be limited to specific forms or arrangements of parts so described and illustrated. The invention is limited only by the claims and the equivalents thereof.

What is claimed is:

1. A method comprising:
   transmitting, by a printing device, authentication data that uniquely identifies at least one of the printing device or a print cartridge installed therein to a client computer remotely connected to the printing device, wherein the authentication data is transmitted to the client computer as a web page including a hyperlink having the authentication data embedded therein; and
   wherein the authentication data can be used by the client computer to authenticate itself to a server computer.

2. The method of claim 1, further comprising:
   reading, by the printing device, at least some of the authentication data from a memory;
   wherein the memory is an integrated part of a component installed in the printing device; and
   wherein the reading step is performed prior to the transmitting step.

3. The method of claim 1, further comprising:
   reading, by the printing device, at least some of the authentication data from a memory; and
   wherein the memory is an integrated part of the print cartridge presently installed in the printing device.

4. The method of claim 3, further comprising:
   receiving, by the client computer, the authentication data;
   displaying, by the client computer, a user interface that includes a hyperlink;
   wherein a selection of the hyperlink causes the client computer to transmit a request to the server computer; and
   wherein the request includes the authentication data.

5. The method of claim 4, wherein the user interface is a web page.

6. The method of claim 4, wherein the user interface is a Graphical User Interface.

7. The method of claim 1, further comprising:
   reading, by the printing device, at least some of the authentication data from a memory of a print cartridge; and
   wherein the print cartridge contains a supply of toner or ink.

8. The method of claim 1, further comprising:
   receiving, by the printing device, a print cartridge that includes a memory, where the memory stores cartridge authentication data that uniquely identifies the print cartridge;
   reading, by the printing device, the cartridge authentication data from the memory; and
   wherein the authentication data transmitted to the client computer includes the cartridge authentication data and an identifier uniquely identifying the printing device.

9. A method comprising:
   transmitting, by a printing device, a web page to a client computer remotely connected to the printing device, the web page including a hyperlink having embedded authentication data usable by the client computer to authenticate itself to a server computer;
   wherein the client computer displays the web page;
   wherein a selection of the hyperlink causes the client computer to transmit a request to the server computer; and
   wherein the request includes the authentication data.

10. The method of claim 9, further comprising:
    receiving, by the server computer, the request; and
    using, by the server computer, the authentication data included in the request to determine if the client computer is authorized to access a resource.

11. A printing device including a printing mechanism, comprising:

a control system configured to transmit a web page including a hyperlink having authentication data embedded therein to a first computer, wherein the hyperlink points to a resource provided by the second computer, and wherein the first computer can use the authentication data to authenticate itself to a second computer and to demonstrate authority to access the resource.

12. The printing device of claim 11, wherein the authentication data is in accordance with a pre-determined authentication protocol.

13. The printing device of claim 11, wherein the control system is configured to obtain at least a portion of the authentication data from a memory of a component installed in the printing device.

14. The printing device of claim 13, wherein the component is a print cartridge.

15. The printing device of claim 11,
a printing mechanism coupled to the control system.

16. A printing device, comprising:
means for receiving a request from a client computer remotely connected to the printing device;
means for responding to the request by transmitting authentication data to the client computer, the authentication data including at least one of a cartridge identifier that uniquely identifies a print cartridge installed in the printing device or a printer identifier that uniquely identifies the printing device;
wherein the authentication data is transmitted to the client computer as a web page including a hyperlink having the authentication data embedded therein;
wherein the authentication data enables the client computer to authenticate itself to a particular server computer; and
wherein the server computer is remotely connected to the client computer.

17. The printing device of claim 16, further comprising:
means for reading at least some of the authentication data from a memory of an installed print cartridge.

18. The printing device of claim 16, further comprising:
at least one memory that stores the printer identifier and a URL address assigned to a resource provided by the server computer; and
means for creating a hyperlink that specifies the URL address and the authentication data; and
wherein the responding means transmits the authentication data by transmitting a web page that includes the hyperlink to the client computer.

19. The printing device of claim 16, wherein the resource is a Web page.

20. A print cartridge for use in a printing device, comprising:
(a) a supply of print material; and
(b) a memory;
wherein the memory stores authentication data for use by a client computer to demonstrate to a particular server computer that the client computer is an authorized party, wherein the authentication data is transmitted to the client computer as a web page including a hyperlink having the authentication data embedded therein, and wherein the authentication data includes an identifier that uniquely identifies the print cartridge.

21. The print cartridge of claim 20, wherein the print material is dry toner.

22. The print cartridge of claim 20, wherein the print material is liquid toner.

23. The print cartridge of claim 20, wherein the print material is ink.

24. The print cartridge of claim 20, wherein the authentication data includes a random number.

25. The printing cartridge of claim 20, wherein the authentication data includes a large number that is greater than 2000 bits.

26. The printing cartridge of claim 20, wherein the authentication data includes at least one encrypted number.

27. In a client computer, a method of requesting access to a resource, comprising:
receiving, from a printing device, a web page including a hyperlink having embedded authentication data associated with the resource;
transmitting a request to access the resource; and
wherein the request includes the authentication data received from the printing device.

28. The method of claim 27,
wherein the request is transmitted to a server; and
wherein the server uses the authentication data to determine if the originator of the request is authorized to access the resource.

29. The method of claim 27,
wherein the client computer transmits the request to the server over the Public Internet.

30. The method of claim 27,
wherein the printing device obtains the authentication data from a memory that is an integrated part of a replaceable component; and
wherein the replaceable component is installed in the printing device.

31. The method of claim 27,
wherein the printing device obtains the authentication data from a memory that is an integrated part of a replaceable component; and
wherein the replaceable component is a print cartridge.

32. The method of claim 27, further comprising:
displaying a user interface that includes a hyperlink to the resource;
receiving a user selection of the hyperlink; and
wherein the transmitting step is performed in response to a user selection of the hyperlink.

33. The method of claim 27, further comprising:
receiving, from the printing device, a serial number assigned to the printing device;
wherein the request further includes the printing device serial number.

34. The method of claim 33, wherein the request is transmitted to a server system; and
wherein the server system uses the authentication data and the printing device serial number to determine if the computer is authorized to access the resource.

35. The method of claim 34, where the authentication data further includes an identifier identifying the printing device and the method further comprising:
using a message history database to determine if a secret number specified by the authentication data has been compromised.

36. The method of claim 27, wherein the transmitting step is performed in response to the a user selection of the hyperlink.

37. The method of claim 27, wherein the hyperlink points to the resource.

38. The method of claim 27, wherein the authentication data includes a cartridge identifier unique to the cartridge, a secret number associated with the cartridge identifier, and a printer identifier unique to the printer.

39. In a server computer, a method comprising:
receiving from a client computer a request for a resource, wherein the request includes authentication data;
using the authentication data to determine if the client computer is an authorized party;
wherein the client computer obtained the authentication data from a printing device; and
wherein the authentication data includes a printer identifier uniquely identifying the printing device and a cartridge identifier uniquely identifying a print cartridge that is presently installed in the printing device, wherein, for each granted request for the resource, a message history record including the cartridge identifier and the printer identifier is stored in a database, and wherein the using the authentication data to determine if the client computer is an authorized party includes:
searching the database to locate all message history records having the cartridge identifier of the request; and
determining whether the number of unique printer identifiers in the located message history records exceeds a predetermined value.

40. The method of claim 39, wherein, if the number of unique printer identifiers in the located message history records exceeds the predetermined value, the client computer is determined to not be the authorized party.

41. The method of claim 39, wherein the authentication data further includes a secret number associated with the cartridge identifier, and wherein the using the authentication data to determine if the client computer is an authorized party includes denoting the client computer as an authorized party only if the server computer has a preexisting cartridge authentication data record corresponding to the cartridge identifier and the secret number of the authentication data of the request.

42. One or more computer-readable storage devices containing computer-executable instructions that, when executed by a printing device, perform the following steps:
reading authentication data from a memory; and
transmitting the authentication data to a remote computer connected to the printing device as a web page including a hyperlink having the authentication data embedded therein;
wherein the remote computer uses the authentication data to authenticate itself to a remote computer.

43. In a printing device, a method comprising:
receiving, in the printing device, a challenge block from a client computer, wherein the challenge block is generated by a server computer in response to a request from the client computer to the server computer and transmitted by the server computer to the client computer;
in response to the receiving, generating a response block in the printing device using a private key obtained from a consumable component installed in the printing device;
transmitting the response block to the client computer; and
wherein the client computer uses the response block to authenticate itself to a server computer.

44. A method comprising:
transmitting, by a printing device, authentication data to a client computer remotely connected to the printing device as a web page including a hyperlink having the authentication data embedded therein; and
wherein the authentication data can be used by the client computer to authenticate itself to a server computer.

* * * * *

UNITED STATES PATENT AND TRADEMARK OFFICE
CERTIFICATE OF CORRECTION

PATENT NO. : 7,623,255 B2  
APPLICATION NO. : 10/971398  
DATED : November 24, 2009  
INVENTOR(S) : Simpson Page 1 of 1

It is certified that error appears in the above-identified patent and that said Letters Patent is hereby corrected as shown below:

In column 9, line 63, delete "several" and insert -- several specific --, therefor.

In column 12, line 59, in Claim 36, after "to" delete "the".

Signed and Sealed this
Eighteenth Day of January, 2011

David J. Kappos
*Director of the United States Patent and Trademark Office*